UNITED STATES PATENT OFFICE.

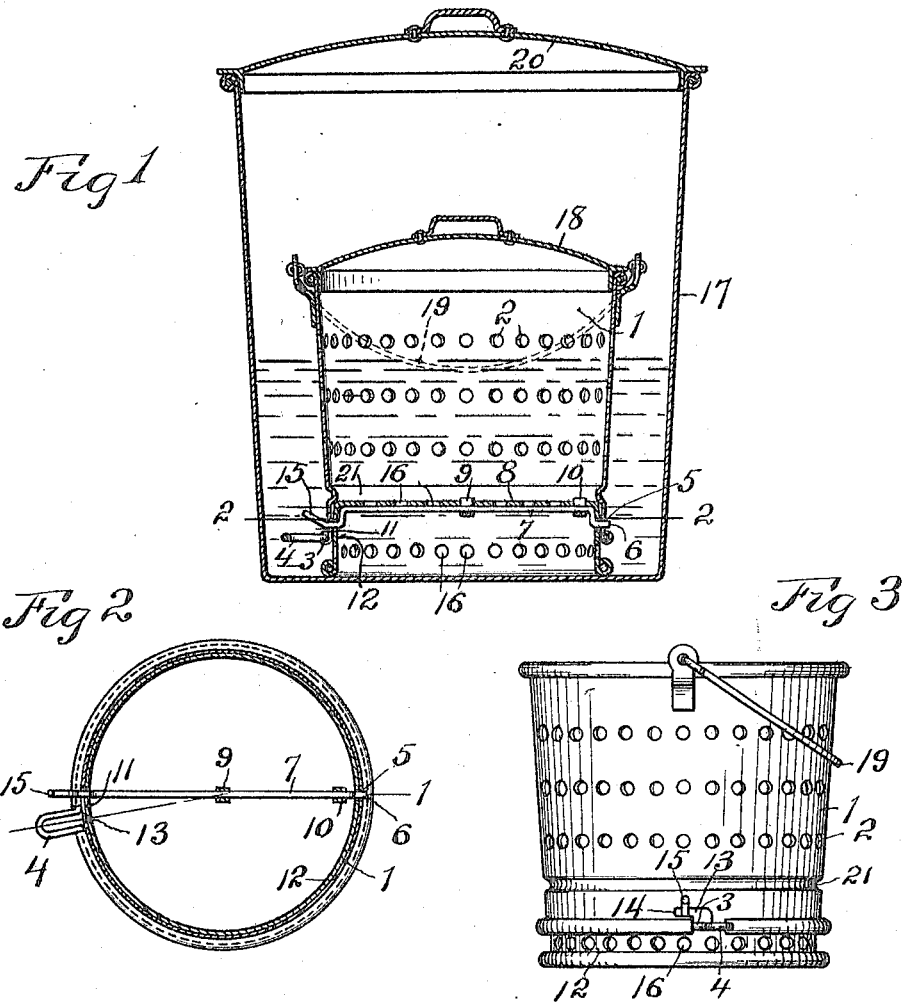

GEORGE HARFORD, OF KANSAS CITY, MISSOURI.

COOKING UTENSIL.

1,221,853.  Specification of Letters Patent.  Patented Apr. 10, 1917.

Application filed January 2, 1917. Serial No. 140,069.

*To all whom it may concern:*

Be it known that I, GEORGE HARFORD, a citizen of the United States, residing at Kansas City, in the county of Jackson and State of Missouri, have invented a certain new and useful Improvement in Cooking Utensils, of which the following is a specification.

My invention relates to improvements in cooking utensils.

The object of my invention is to provide a novel, convenient and efficient utensil for cooking, without danger of burning, rice, potatoes and other foods which are designed to be cooked in water.

A further object of my invention is to provide a cooking utensil with novel means for releasably attaching the bottom thereto in a manner such that the bottom may be easily and quickly detached for the purpose of emptying the utensil without having to invert it.

Still another object of my invention is to provide a cooking utensil with novel means for effecting a circulation of water through the food which is being cooked.

The novel features of my invention are hereinafter fully described and claimed.

In the accompanying drawing which illustrates my invention,

Figure 1 is a vertical sectional view on the line 1—1 of Fig. 2, showing my improved cooking utensil, in the preferred embodiment thereof, mounted in a water containing vessel.

Fig. 2 is a horizontal section on the line 2—2 of Fig. 1.

Fig. 3 is a side elevation of the form of my invention shown in Fig. 1, the cover of the utensil being removed.

Similar reference characters designate similar parts in the different views.

1 designates the body of my improved cooking utensil, as shown in Figs. 1 to 3, the body being provided with perforations 2 and being provided, preferably, with a wired lower end, the wire 3 employed for this purpose being provided with an outwardly horizontally projecting U-shaped bend 4, which effects a double function hereinafter explained.

One side of the body 1 is provided with a hole 5 adapted to receive therethrough the stationary end 6 of a horizontal spring wire 7, which is disposed diametrically at the under side of the top 8 of an inverted cup-shaped bottom member which is adapted to be slipped into and out of the lower end of the body 1.

The spring wire 7 is fastened by a central clip 9 to the top 8 of the bottom member. It may also be secured to the bottom member by means of a clip 10 disposed adjacent to the stationary end 6.

The opposite end of the spring wire 7 extends through a horizontal slot 11 provided in the side wall 12 of the bottom member, said slot 11 being adapted to register, when the bottom member is in the closed position shown in the drawing, with a slot 13 which extends upwardly from the lower edge of the body 1 and registers with the space between the arms of the band 4, and which is provided with a lateral offset 14, Fig. 3, disposed above the wire 3 and adapted to receive the laterally movable end 15 of the wire 7, which is adapted to pass upwardly between the arms of the bend 4 through the slot 13 and into the offset 14 of the latter, whereby the bottom member is releasably held in the closed position. By laterally flexing the free end 15 of the spring wire 7, it may be disposed in alinement with the bend 4, thereby permitting the adjacent side of the bottom member to be swung downwardly, whereupon the stationary end 6 of the wire may be withdrawn from the hole 5, and the bottom member thus entirely released from the body 1.

Preferably the top 8 of the bottom member is provided with perforations 16. The side wall 12 of the bottom member is also provided below the lower edge of the body 1 with an annular row of perforations 16 which permit water to pass into the cup-shaped bottom member and thence through the perforations 16 into the material to be cooked contained within the body 1, and thence through the openings 2 into a containing vessel 17 upon the bottom of which the bottom member rests.

The body 1 may be provided with a removable cover 18 and with a bail 19 of the usual type. The vessel 17 may also be provided with a cover 20.

In the operation of this form of my invention, the bottom member is inserted in the lower end of the body 1, the stationary end 6 of the wire 7 first being inserted through the hole 5, after which the bottom member is swung upwardly into the closed position against an annular flange 21 on the inner side of the body 1, the free end 15 of the wire 7 being sprung laterally from its normal straight position, shown in Fig. 2, so as to pass between the arms of the bend 4 and upwardly through the slot 13, after which on being released, the free end 15 will spring laterally into the offset 14 of the slot 13. The material to be cooked is then placed in the body 1, the cover 18 applied to the body and the utensil placed in water contained in the vessel 17.

The food may now be cooked in the usual manner, without danger of being scorched.

The bend 4 in the form shown in Figs. 1 to 3 not only permits the passage vertically of the free end 15 of the spring wire, but it permits of a certain amount of expansibility of the lower end of the body 1, so as to allow the bottom member to have a fairly snug fit within the body, while at the same time permitting the bottom member to be swung in and out of the body on the stationary end 6 of the wire 7.

I do not limit my invention to the structures shown and described, as modifications, within the scope of the appended claims, may be made without departing from the spirit of my invention.

What I claim is:—

1. A cooking utensil having a body having a wired lower end, the wire having a projecting U-shaped bend, the body having a slot extending upwardly from its lower edge in register with said bend and having a lateral off-set above said wire, a bottom member insertible into and removable from the lower end of said body, the body at the side opposite the slot having a hole, the bottom member having a slot adapted to register with the slot in the body, and a spring wire secured to the under side of the bottom member so as to have one stationary end and one end laterally flexible, the stationary end being adapted to enter said hole, and the laterally flexible end being extended through the slot in the bottom member and adapted to pass through said bend and enter the first named slot and said lateral offset.

2. A cooking utensil having a perforated body provided with a wired lower end, the wire having a laterally outwardly extending U-shaped bend, the body having a slot extending upwardly from its lower edge in register with said bend, the slot having a lateral offset above said wire, a bottom member insertible into and removable from the lower end of the body and provided with a perforated top and perforations in its sides below the body, the bottom member having a slot adapted to register with the slot in the body, and a spring wire fastened to said bottom member so as to have one stationary end adapted to extend through one of the perforations in the body and having a flexible end extending through the slot in the bottom member and adapted to pass through said bend and to enter said slot in the body and said lateral offset.

In testimony whereof I have signed my name to this specification.

GEORGE HARFORD.

Copies of this patent may be obtained for five cents each, by addressing the "Commissioner of Patents, Washington, D. C."